3,330,759
PETROLEUM-DERIVED PITCH
Leonard Henschel, Flushing, N.Y., and Lester A. H. Baum, Cherry Hill, N.J., assignors to Mobil Oil Corporation, a corporation of New York
No Drawing. Filed Mar. 17, 1965, Ser. No. 440,637
4 Claims. (Cl. 208—40)

This invention relates to, and has for its object to provide, petroleum-derived pitch. More particularly, the invention relates to, and has for its object to provide, petroleum-derived pitch of improved specific gravity, which is useful as a saturant in the fabrication of molded materials, wherein this saturant exhibits functional properties which are equal or superior to, and which can be employed as a partial or total replacement for, coal-tar pitch which has heretofore been employed for such applications.

Recently increased commercial requirements for coal-tar products have also resulted in increased requirements for coal-tar pitch. In this respect, it is found that the bulk of the coal-tar products plants in the United States are operated by steel companies, and the pitch which is obtained by the distillation of coal-tar is employed as a fuel for their open-hearth furnaces. Thus, of the total quantity of coal-tar produced, only a small amount is available for use as a pitch in other industrial applications. In order to satisfy the increasing demand for coal-tar pitch, attempts have been made to produce a petroleum-derived pitch, having a satisfactory and useful specific gravity, comparable or superior to coal-tar pitch, in which such petroleum-derived pitch can be successfully employed as a partial or total replacement for previously produced coal-tar pitch, and which has a specific utility as a saturant in the fabrication of molded materials.

In accordance with the present invention, there is now provided petroleum-derived pitch which meets the above-described requirements, and which is produced by a novel method, including the steps, as more fully hereinafter described, in which a petroleum pitch having a softening point in the range from about 210° F. to about 240° F. and a specific gravity in the range from about 1.24 to about 1.25, is blended with a hydrocarbon fraction boiling predominantly above 500° F. and having an atomic carbon to hydrogen ratio in the range from about 0.6 to about 0.91, wherein the petroleum-derived pitch, so produced, has a softening point in the range from about 160° F. to about 180° F. and a specific gravity in the range from about 1.215 to about 1.240. As is also more fully hereinafter described, the novel and improved petroleum-derived pitch thus produced, possesses a wide field of useful applicability, and is particularly outstanding in such applications as a fiber pipe saturant, a saturant for siding, insulating board and weatherboard, a plasticizer for rubber materials, a sandmold binder, an additive for paints, a water-proofing material, and also as a molding compound, as well as for various other applications, which, by reason of its unique properties, will become readily apparent to those skilled in the art.

More specifically, the petroleum-derived pitch of the present invention, suitable for use as a saturant in the manufacture of molded materials, as well as in other applications, is produced by a process which comprises, in general: contacting a petroleum hydrocarbon fraction having an initial boiling point above about 400° F. and an end boiling point of about 1200° F. (in a preferred range of about 400° F. to about 1050° F.), with a cracking catalyst under catalytic cracking conditions; removing from the resulting product a catalytically cracked hydrocarbon fraction boiling predominantly above 500° F. and having an atomic carbon to hydrogen ratio in the range of from about 0.6 to about 0.91; subjecting this catalytically cracked hydrocarbon fraction to thermal cracking under conditions which include a temperature in the range from about 850° F. to about 1050° F., to produce a thermal asphalt having a softening point in the range from about 130° F. to about 180° F. and a specific gravity in the range from about 1.10 to about 1.20 or, preferably, subjecting the catalytically cracked hydrocarbon fraction to thermal cracking at a temperature in the range from about 850° F. to about 1040° F. to produce a thermal asphalt having a softening point in the range from about 140° F. to about 170° F. and a specific gravity in the range from about 1.15 to about 1.19; passing this thermal asphalt through a heat-soaking zone at a pressure within the range from about 30 to about 400 pounds per square inch gauge (preferably within the range from about 100 to about 200 pounds per square inch gauge), and at a temperature in the range from about 900° F. to about 1100° F. (preferably at a temperature in the range from about 940° F. to about 1020° F.) at a residence time from about 4 to about 20 minutes (preferably from about 7 to about 15 minutes), to produce the above-described petroleum pitch having a softening point in the range from about 210° F. to about 240° F. and the aforementioned specific gravity in the range from about 1.24 to about 1.25. This petroleum pitch thus produced is then blended with the aforementioned hydrocarbon fraction boiling predominantly above 500° F. and having the aforementioned atomic carbon to hydrogen ratio in the range from about 0.6 to about 0.91, to produce the novel and improved petroleum-derived pitch of the present invention, having the aforementioned softening point in the range from about 160° F. to about 180° F., and a specific gravity in the range from about 1.215 to about 1.240.

As indicated above, the aforementioned petroleum pitch produced in accordance with the process of the present invention, is blended with a hydrocarbon fraction boiling predominantly above 500° F. and having an atomic carbon to hydrogen ratio in the range from about 0.6 to about 0.91 to produce the novel petroleum-derived pitch of the present invention. This last mentioned hydrocarbon fraction may, if so desired, be similar in all respects to the catalytically cracked hydrocarbon fraction which was originally obtained by contacting the petroleum hydrocarbon fraction having an initial boiling point above about 400° F. and an end boiling point of about 1200° F. with the cracking catalyst.

The catalysts which can be employed in the aforementioned cracking operation, may comprise any catalyst which under cracking conditions provides not only satisfactory yields of gasoline but a higher boiling product boiling predominantly above about 500° F. and having the aforementioned atomic carbon to hydrogen ratio in the range from about 0.6 to about 0.91. Among the typical catalysts which can be employed for this purpose are activated clays, aluminosilicates, silica-alumina, and silica-magnesia, silica-zirconia, silica-thoria, silica-beryllia, silica-titania, as well as ternary combinations such as silica-alumina-thoria, silica-alumina-zirconia, silica-alumina-magnesia, silica-magnesia-zirconia, and mixtures thereof. Preferred cracking catalysts employed in the process of the present invention, comprise a crystalline aluminosilicate, and, more preferably, a crystalline rare earth aluminosilicate, having an alkali metal content of less than three weight percent or an admixture of such crystalline aluminosilicate suspended and distributed throughout an inorganic oxide gel matrix such as silica-alumina, and the like, which have cracking properties themselves. A more complete description for the aforementioned process of preparing the petroleum pitch having a softening point in the range from about 210° F. to about 240° F. and a specific gravity in the range from about 1.24 to about 1.25 and the aforementioned hydrocarbon fraction boiling predominantly above 500° F. and having an atomic carbon to hydrogen ratio in the range from about 0.6 to about 0.91, to be brought into contact with the petroleum pitch, will be found in U.S. Patent 3,140,248, issued July 7, 1964, and the disclosure thereof, in its entirety, is incorporated herein by reference.

The improved final petroleum-derived pitch, produced in accordance with the present invention, and which is prepared from the aforementioned preliminary petroleum pitch as prepared in accordance with the method described in U.S. Patent 3,140,248, exhibits an outstanding superiority not only with respect to increased specific gravity, viz. from about 1.215 to about 1.240, as compared with a specific gravity from about 1.10 to about 1.20 for the aforementioned original unsoaked thermal asphalt, but also with respect to increased coking value, viz. from about 34 to about 45 for the final pitch, as compared with a coking value of from about 28 to about 33 for the unsoaked asphalt; and also with respect to the increased percentage of benzene insolubles, viz. from about 13 to about 20 percent for the final pitch, as compared with a value of from about 0 to about 5 percent for the unsoaked material.

Of predominant importance with respect to the improved petroleum-derived pitch produced in accordance with the present invention, is the aforementioned realization of increased specific gravity, thereby resulting in a pitch which can be employed as a partial or total replacement for conventional coal-tar pitch in many industrial applications. Thus, the aforementioned unsoaked thermal asphalt having a softening point of about 170° F. can not be used as a replacement for coal-tar pitch in such applications as fiber pipe manufacture, in which the pitch functions as a saturant. On the other hand, it is found that the improved petroleum-derived pitch of the present invention having, for example, a softening point of about 170° F., can be used as a replacement for coal-tar pitch as a fiber pipe saturant.

Apart from the aforementioned differences between heretofore produced thermal asphalts and the improved pitch produced in accordance with the present invention, are such outstanding qualities as improved weathering resistance of fiber pipe and other similarly molded articles in which this improved pitch is used as a saturant; improved bacterial resistance in which degradation of the molded article is markedly reduced; and also the superior ability to withstand water absorption of articles in which this improved pitch is present as a saturant.

The following examples and comparative data will serve to illustrate the outstanding properties realized in the improved petroleum-derived pitches of the present invention.

*Example 1*

A catalytically cracked hydrocarbon fraction boiling at about 597° F. and having an atomic carbon to hydrogen ratio of about 0.83, obtained by catalytic cracking of a petroleum hydrocarbon fraction having an initial boiling point above about 400° F. and an end boiling point of about 1200° F., was subjected to thermal cracking under conditions which included a temperature within the range from about 850° F. to about 1050 F. to produce a thermal asphalt having a soft point of about 147° F. and a specific gravity of about 1.175. This thermal asphalt was then passed through a heat-soaking zone at a pressure of about 160 pounds per square inch gauge and at a temperature of about 960° F. and at a residence time of about 10 minutes to produce a petroleum pitch having a softening point of about 230° F. and a specific gravity of 1.248. This petroleum pitch was then blended with a hydrocarbon fraction boiling at about 550° F. and having an atomic carbon to hydrogen ratio of about 0.80 to produce an improved petroleum-derived pitch having the properties shown below:

| | |
|---|---|
| Specific gravity at 77/77° F | 1.221 |
| Softening point (R. & B.), ° F | 171 |
| Penetration: | |
| 115/100/5 | 19 |
| 130/100/5 | 61 |
| 140/100/5 | 108 |
| Viscosity at— | |
| 300° F., S.F.S./cs | 132/281 |
| 350° F | 28/60 |
| Flash, COC, ° F | 500 |
| Conradson carbon, percent | 40.0 |
| Benzene insolubles, percent | 15.70 |
| Quinoline insolubles, percent | 0.72 |
| Sulfur, percent | 1.31 |
| Ash, percent | 0.08 |
| Carbon, percent | 92.4 |
| Hydrogen, percent | 5.7 |
| C/H ratio, percent | 1.35 |

As previously indicated, the petroleum pitch produced by the process such as is disclosed in the aforementioned U.S. Patent 3,140,248, possesses a marked superiority over commercially available coal-tar pitch, particularly with respect to its use as a binder, for example in the manufacture of electrodes. Such petroleum pitches, as previously indicated, have a softening point in the range from about 210° F. to about 240° F., and a specific gravity in the range from about 1.24 to about 1.25. This petroleum pitch is, however, too hard and too brittle to be employed as a satisfactory saturant, as previously indicated, in the manufacture of molded articles. However, by virture of the subsequent treatment of this material in accordance with the improved process of the present invention, in which it is further blended with the above-described hydrocarbon fraction boiling predominantly above 500° F. and having an atomic carbon to hydrogen ratio in the range from about 0.6 to about 0.91, the novel and improved petroleum-derived pitch of the present invention, is produced, having a specific gravity of from about 1.215 to about 1.240 and a softening point in the range from about 160° F. to about 180° F., as illustrated in Example 1 above. It will be noted that although the specific gravity range of the improved petroleum-derived pitch of the present invention is less than produced by the aforementioned process of U.S. Patent 3,140,248, it is nevertheless significantly higher than that of conventional thermal asphalt, and yet possesses no significantly outstanding differences with respect to the softening point range.

In order to illustrate the outstanding properties of the improved petroleum-derived pitch of the present invention, as a saturant, for example, in the preparation of fiber pipes, such pipes were first prepared in the following manner:

The fiber pipe is made from waste newsprint in a wet process using an Oliver type cylinder and felt rolls. The paper web is wrapper in about 300 layers on a mandrel, for a pipe with a ⅜″ wall thickness. The paper tube is dried at a temperature from about 300° F. to about 400° F., to a moisture content of about 3 to about 4%, and is then vacuum impregnated with bituminous pitch at 28 inches of vacuum in two cycles. Vacuum applied to the impregnating vessel causes air and water vapor to be pulled out of the tube through the pitch. At the end of each cycle, the vacuum is released and atmospheric pressure forces the saturant into the evacuated tube matrix. Total saturation time is about one hour, in a batch operation. Fiber pipe product, thus produced, was subjected to a series of weathering, bacterial and water absorption tests. These are illustrated by the following Tables I to III. In these tables, A and C asphalts designate thermal asphalts, and B asphalt designates a blown residual asphalt.

In Table I are shown the results obtained with respect to determining the weatherability of aforementioned saturated fiber pipe. The test results clearly indicate that the improved petroleum-derived pitch of the present invention, was equal to or superior to coal tar in weatherability.

TABLE I.—WEATHERING OF SATURATED FIBER PIPE

| Example | Saturant Composition | Outdoor Exposure for 2 Years | | | Accelerated Weather-O-Meter 200 Hours ASTM D 529-59T Cycle A | | |
|---|---|---|---|---|---|---|---|
| | | Color | Surface Appearance | Rating | Color | Surface Appearance | Rating |
| 1 | Coal Tar Pitch | Black | High Gloss | Excellent | Black | High Glass | Excellent. |
| 2 | Improved Petroleum-Derived Pitch | do | do | do | do | do | Do. |
| 3 | A-170 | Brown | Dull | Poor | Brown | Dull | Poor. |
| 4 | A-190 | do | do | do | do | do | Do. |
| 5 | C-150 | do | do | do | do | do | Do. |
| 6 | C-170 | do | do | do | do | do | Do. |
| 7 | C-190 | do | do | do | do | do | Do. |

The following Table II illustrates the data obtained with respect to bacterial tests performed on conventional asphalts and on the improved pipe saturant of the present invention. From this table, the marked superiority of the improved petroleum-derived pitch saturant, as compared with other conventional asphalt materials, will become readily apparent.

TABLE II.—BACTERIAL TESTS ON PIPE SATURANTS BUSHNELL-HAAS ENRICHED CULTURE

| Time Interval | Live Bacteria Count—Millions per ml. | | | | |
|---|---|---|---|---|---|
| | Standard Water | Example 1— Improved Petroleum- Derived Pitch | Example 2— B-190 Blown Asphalt | Example 3— A-190 Thermal Asphalt | Example 4— Coal Tar Pitch |
| Initial | 0.1 | 0.1 | 0.1 | 0.1 | 0.1 |
| 2 Days | 10.2 | 9.6 | 13.0 | 10.8 | 9.6 |
| 4 Weeks | 0.1 | 0.1 | 20.0 | 0.1 | 0.1 |
| | Bacteria Colonies on Surface of Saturant | | | | |
| 1 Week | 0 | 0 | + | 0 | 0 |
| 4 Weeks | 0 | 0 | + | 0 | 0 |

0 No Colonies present.   + Colonies present.

In Table III are shown the water absorption and fiber exposure data obtained with regard to fiber pipe containing as a saturant (1) conventional thermal asphalt, (2) improved petroleum-derived pitch of the present invention, and (3) conventional coal-tar pitch. The improved petroleum-derived pitch of the present invention and coal-tar pitch, showed comparatively low water absorption values and freedom from fiber exposure.

TABLE III.—WATER ABSORPTION AND FIBER EXPOSURE ON LABORATORY PREPARED FIBER PIPE THERMAL ASPHALT—IMPROVED PETROLEUM-DERIVED PITCH—COAL TAR PITCH

|  | Saturant Composition | | |
|---|---|---|---|
|  | Example 1—Thermal Asphalt | Example 2—Improved Petroleum-Derived Pitch | Example 3—Coal Tar Pitch |
| Voids, Percent by Vol. (Calculated) | 0.8 | 1.3 | 1.4 |

|  | Weight Gain, Percent | | |
|---|---|---|---|
|  | Bushnell-Haas Culture | Bushnell-Haas Culture | Bushnell-Haas Culture |
| 2 Months | 6.7 | 3.0 | 4.8 |
| 4 Months | 8.6 | 4.1 | 6.2 |
| 6 Months | 11.7 | 6.9 | 8.8 |
| 1 Year | 16.9 | 8.8 | 11.8 |
| 2 Years | 21.1 | 12.9 | 14.6 |

|  | Number of Points of Fiber Exposure | | |
|---|---|---|---|
| 2 Months | 0 | 0 | 0 |
| 4 Months | 0 | 0 | 0 |
| 6 Months | 0 | 0 | 0 |
| 1 Year | 0 | 0 | 0 |
| 2 Years | 0 | 0 | 0 |

|  | Weight Gain, Percent | | |
|---|---|---|---|
|  | Distilled Water | Distilled Water | Distilled Water |
| 2 Months | 7.0 | 5.1 | 7.2 |
| 4 Months | 9.2 | 7.2 | 9.5 |
| 6 Months | 12.4 | 11.0 | 12.4 |
| 1 Year | 16.4 | 13.0 | 16.3 |
| 2 Years | 20.3 | 16.8 | 18.5 |

|  | Number of Points of Fiber Exposure | | |
|---|---|---|---|
| 2 Months | 0 | 0 | 0 |
| 4 Months | 12 | 0 | 0 |
| 6 Months | 12 | 0 | 0 |
| 1 Year | 12 | 0 | 0 |
| 2 Years | 12 | 0 | 0 |

No bacterial attack noted in any of above observations.

From the foregoing description and comparative data, it will be apparent that the novel improved petroleum-derived pitches of the present invention possess a marked superiority, as saturants for a wide variety of molded materials, as compared with heretofore produced commercially available coal-tar pitch thermal asphalts. While preferred embodiments of the compositions of the present invention and the process for their preparation have been described for purposes of illustration, it should be understood that various modifications and adaptations thereof, which will be obvious to those skilled in the art, may be made without departing from the spirit of the invention.

We claim:

1. A process for producing a petroleum-derived pitch, suitable for use as a saturant in the manufacture of molded materials, which comprises: contacting a petroleum hydrocarbon fraction having an initial boiling point above about 400° F. and an end boiling point of about 1200° F. with a cracking catalyst under catalytic cracking conditions; removing from the resulting product a catalytically cracked hydrocarbon fraction boiling predominantly above 500° F. and having an atomic carbon to hydrogen ratio in the range of about 0.6 to about 0.91; subjecting said catalytically cracked hydrocarbon fraction to thermal cracking under conditions which include a temperature in the range from about 850° F. to about 1050° F. to produce a thermal asphalt having a softening point in the range from about 130° F. to about 180° F., and a specific gravity in the range from about 1.10 to about 1.20; passing said thermal asphalt through a heat-soaking zone at a pressure within the range from about 30 to about 400 pounds per square inch gauge and at a temperature in the range from about 900° F. to about 1100° F., at a residence time from about 4 to about 20 minutes to produce a petroleum pitch having a softening point in the range from about 210° F. to about 240° F. and a specific gravity in the range from about 1.24 to about 1.25; and blending the petroleum pitch thus produced with a hydrocarbon fraction boiling predominantly above 500° F. and having an atomic carbon to hydrogen ratio in the range from about 0.6 to about 0.91 to produce an improved petroleum-derived pitch having a softening point in the range from about 160° F. to about 180° F. and a specific gravity in the range from about 1.215 to about 1.240.

2. A process for producing a petroleum-derived pitch, suitable for use as a saturant in the manufacture of molded materials, which comprises: contacting a petroleum hydrocarbon fraction having an initial boiling point above about 400° F. and an end boiling point of about 1050° F. with a cracking catalyst under catalytic cracking conditions; removing from the resulting product a catalytically cracked hydrocarbon fraction boiling predominantly above 500° F. and having an atomic carbon to hydrogen ratio in the range of about 0.6 to about 0.91; subjecting said catalytically cracked hydrocarbon fraction to thermal cracking under conditions which include a temperature in the range from about 850° F. to about 1050° F. to produce a thermal asphalt having a softening point in the range from about 140° F. to about 170° F. and a specific gravity in the range from about 1.15 to about 1.19 passing said thermal asphalt through a heat-soaking zone at a pressure within the range from about 30 to about 400 pounds per square inch gauge and at a temperature in the range from about 940° F. to about 1020° F., at a residence time from about 4 to about 20 minutes to produce a petroleum pitch having a softening point in the range from about 210° F. to about 240° F. and a specific gravity in the range from about 1.24 to about 1.25; and blending the petroleum pitch thus produced with a hydrocarbon fraction boiling predominantly above 500° F. and having an atomic carbon to hydrogen ratio in the range from about 0.6 to about 0.91 to produce an improved petroleum-derived pitch having a softening point in the range from about 160° F. to about 180° F. and a specific gravity in the range from about 1.215 to about 1.240.

3. A process for producing a petroleum-derived pitch, suitable for use as a saturant in the manufacture of molded materials, which comprises: contacting a petroleum hydrocarbon fraction having an initial boiling point above about 400° F. and an end boiling point of about 1050° F. with a cracking catalyst under catalytic cracking conditions; removing from the resulting product a catalytically cracked hydrocarbon fraction boiling predominantly above 500° F. and having an atomic carbon to hydrogen ratio in the range of about 0.6 to about 0.91; subjecting said catalytically cracked hydrocarbon fraction to thermal cracking under conditions which include a temperature in the range from about 850° F. to about 1040° F. to produce a thermal asphalt having a softening point in the range from about 140° F. to about 170° F. and a specific gravity in the range from about 1.15 to about 1.19; passing said thermal asphalt through a heat-soaking zone at a pressure within the range from about 100 to about 200 pounds per square inch gauge and at a temperature in the range from about 940° F. to about 1020° F., at a residence time from about 7 to about 15 minutes to produce a petroleum pitch having a softening point in the range from about 210° F. to about 240° F. and a specific gravity in the range from about 1.24 to about 1.25; and blending the petroleum pitch thus produced with a hydrocarbon fraction boiling predominantly above 500° F. and having an atomic carbon to hydrogen ratio in the range from about 0.6 to about 0.91 to produce an improved petroleum-derived pitch having a softening point in the range from about 160° F. to about 180° F. and a specific gravity in the range from about 1.215 to about 1.240.

4. The petroleum-derived pitch produced by the process of claim 1.

References Cited

UNITED STATES PATENTS

| | | | |
|---|---|---|---|
| 2,270,047 | 1/1942 | Goodwin et al. | 117—168 |
| 2,581,685 | 1/1952 | McMillan | 117—168 |
| 2,658,857 | 11/1953 | Roediger | 208—40 |
| 2,698,280 | 12/1954 | Hersberger et al. | 208—40 |
| 2,826,507 | 3/1958 | Waddill | 208—22 |
| 2,992,181 | 11/1961 | Renner | 208—22 |
| 3,140,248 | 7/1964 | Bell et al. | 208—42 |
| 3,173,851 | 3/1965 | King et al. | 208—23 |

DANIEL E. WYMAN, *Primary Examiner.*

P. E. KONOPKA, *Assistant Examiner.*